United States Patent [19]

Hegg

[11] Patent Number: 4,904,049
[45] Date of Patent: Feb. 27, 1990

[54] HIGH-CONTRAST FIBER OPTIC DIFFUSION FACEPLATE WITH RADIUSED FIBERS

[75] Inventor: Ronald G. Hegg, Inglewood, Calif.
[73] Assignee: Hughes Aircraft Company, Los Angeles, Calif.
[21] Appl. No.: 239,250
[22] Filed: Sep. 1, 1988
[51] Int. Cl.[4] .................................................. G02B 6/08
[52] U.S. Cl. ................................ 350/96.27; 350/96.25
[58] Field of Search .................... 350/3.7, 96.24, 96.25, 350/96.27; 358/250, 901

[56] References Cited

U.S. PATENT DOCUMENTS

| | | | |
|---|---|---|---|
| 3,797,910 | 3/1974 | Westwig | 350/96.27 |
| 4,573,082 | 2/1986 | Jeskey | 358/250 |
| 4,586,781 | 5/1986 | Gunther et al. | 350/3.7 |
| 4,743,091 | 5/1988 | Gelbart | 350/252 |

*Primary Examiner*—Frank Gonzalez
*Attorney, Agent, or Firm*—Leonard A. Alkov; Wanda K. Denson-Low

[57] ABSTRACT

A radiused fiber optic faceplate is disclosed, particularly suited for use in optical apparatus comprising a high gain diffusion screen or a direct view CRT. The respective optical axis of the fibers are each substantially oriented so that the refracted information-bearing light passed through each fiber is directed to the exit pupil and ambient light from outside the exit pupil is absorbed in the faceplate. The faceplate therefore substantially increases the contrast enhancement.

3 Claims, 3 Drawing Sheets

HIGH-CONTRAST FIBER OPTIC DIFFUSION FACEPLATE WITH RADIUSED FIBERS

BACKGROUND OF THE INVENTION

The present invention relates to optical display apparatus, and in particular to optical display apparatus employing fiber optic faceplates in conjunction with conventional high gain or holographic diffusing screens or direct view cathode ray tubes (CRTs).

Fiber optic faceplates have been used in the past in conjunction with holographic diffusion screens. A particular example is disclosed in U.S. Pat. No. 4,586,781, assigned to the assignee of this application and incorporated herein by this reference. However, a field lens is typically added after the faceplate to direct the diffused light to the exit pupil, as shown in FIGS. 1A and 1B. Here, the diffusion screen 20 with its holographic film 22 (e.g., a dichromated gelatin film) is assembled with the fiber optic faceplate 24 and the convex field lens 26. The field lens 26 with its curved surface 27 provides a greater probability of sun ball reflections making their way back to the exit pupil and washing out a portion of the screen. The sun ball reflections may occur with the curved surface 27 of the lens 26 facing the exit pupil (FIG. 1A) or with the surface 27 facing the faceplate 24 (FIG. 1B). The only way to minimize the sun ball problem is to eliminate any curved surface after the screen 24.

Fiber optic faceplates have also been used in the past with direct view CRTs to enhance the contrast. However, since the fibers are all parallel to each other in an conventional fiber optic faceplate, the numerical aperture ("NA") must be kept purposely high in order that the viewer can see all of the CRT from his viewing position. This is illustrated in FIG. 2, where the faceplate 26' is assembled with the CRT 30, with the respective fans 35-37 of rays exiting points 31-33 on the exterior facing surface of the faceplate 26'. The higher the numerical aperture, however, the more ambient light from the environment around the exit pupil can transmit through the faceplate and scatter off the phosphor surface 30A of the CRT 30, thereby reducing contrast.

It is therefore an object of the invention to provide a fiber optic faceplate for use in optical apparatus which absorbs light from ambient surroundings outside the exit pupil of the apparatus and results in improved contrast, and without increasing the probability of sun ball reflections interfering with viewing of the image produced by the optical apparatus.

SUMMARY OF THE INVENTION

A radiused fiber optic faceplate is disclosed, wherein the optical fibers are respectively oriented so that the refracted light passing through each optical fiber is substantially directed toward a predetermined exit pupil, instead of the fibers being parallel to each other as in conventional fiber optic faceplates. With a radiused fiber optic faceplate, its numerical aperture can be made substantially smaller than would otherwise be required for a conventional faceplate. A particular advantage of the radiused faceplate is that ambient light from outside the predetermined exit pupil is substantially absorbed by the light absorbing material surrounding each fiber of the faceplate, thereby increasing contrast.

A radiused fiber optic faceplate may be advantageously employed in optical display apparatus to increase the contrast. By reducing the numerical aperture of the faceplate, the exit pupil of the display can be reduced to match the desired viewing box or area for the display, negating any ambient effects outside the box. Particular application of such optical apparatus are color projection liquid crystal displays employing high-gain diffusion screens with low back scatter to achieve high contrast and high readability in an aircraft cockpit environment (e.g., with 10,000 cf ambient light intensity). Another application is direct view monochromatic CRT displays.

The invention also includes a method for fabricating a radiused fiber optic faceplate from a conventional faceplate having parallel fibers.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DISCLOSURE

The invention comprises a radiused fiber optic faceplate wherein the optical axes of the fibers are respectively oriented toward a predetermined exit pupil. When employed in an optical apparatus comprising a diffusion screen or a direct view CRT, the radiused faceplate directs the image-bearing light toward the exit pupil while absorbing substantially all outside ambient light. This results in increased contrast and substantially reduced probability of sun ball reflection viewing interference.

Figure 3:
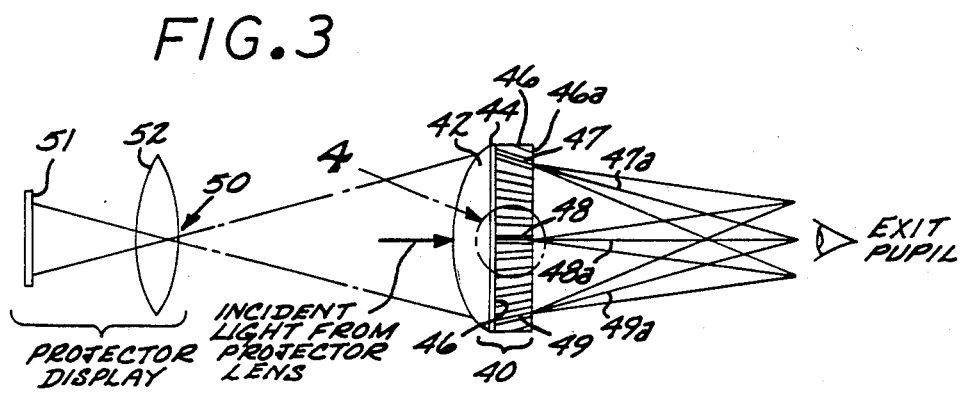
FIG. 3 illustrates a preferred embodiment of an optical apparatus employing the invention, where a diffusion screen receives image light from a projection source and directs the image light through a radiused faceplate toward a predetermined exit pupil.

Referring now to FIG. 3, a preferred embodiment of an optical apparatus employing the radiused faceplate is shown. The optical apparatus 40 receives light of display source 51 from the projection lens aperture stop 50 through a projection lens 52. The assembly 40 comprises a field lens 42, the diffusion layer or screen 44 and the radiused fiber optic faceplate 46. The faceplate 46 comprises respective flat surfaces 46A and 46B, which for this example are preferably substantially parallel to each other. The surface 46A is adjacent the diffusion screen 44, and the external surface 46B faces the exit pupil of the optical apparatus 40. The faceplate comprises a plurality of microscopically thin optical fibers, e.g., fibers 47–49, which are secured together by a heat and bonding process. Light absorbing interfiber material clads each fiber, as in conventional fiber optic faceplates. When light entering each fiber is at a small enough angle to the fiber center axis, the light propagates through the fiber by repetitive total internal reflections of the fiber-cladding interface, while light entering the fiber at too steep an angle partially passes through the interface, causing the partially-reflected ray to quickly die out.

Figure 4:
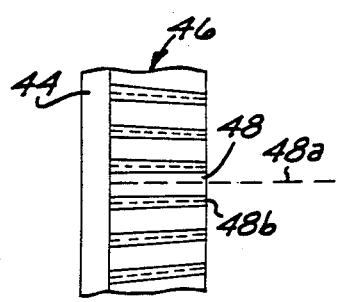
FIG. 4 is an enlarged close-up detail of a portion of the fiber optic faceplate comprising the optical apparatus of FIG. 3.

FIG. 4 is an enlarged close-up of a portion of the faceplate 46, showing a center fiber 48 and surrounding fibers in greater detail, with the radiusing of the fibers being exaggerated for illustrative purposes. The light absorbing material is shown as inter-fiber material 48B. The optical axes of the fibers comprising the faceplate 46 are respectively oriented so that the refracted light passed through the fibers is directed toward the predetermined exit pupil for the optical apparatus. Thus, exemplary axes 47A–47C of fibers 47–49 (FIG. 3) are oriented toward the exit pupil, neglecting the refracting effect of any index of refraction change from the fiber medium to the medium in which the exit pupil is located.

Figure 6:
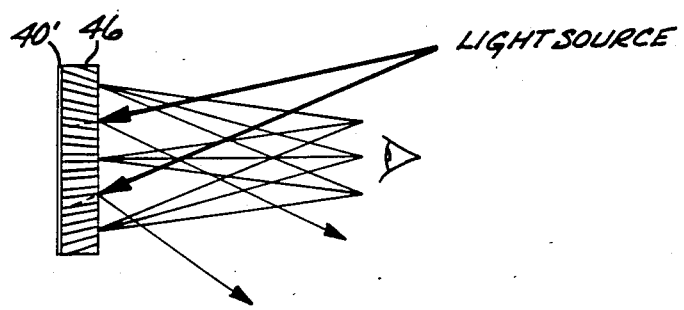
FIG. 6 is a simplified schematic illustration showing the contrast enhancement capability of a radiused fiber optic faceplate such as is employed with the optical apparatus of FIG. 3.

The radiused fiber optic faceplate 46 has an advantage of increasing the contrast enhancement of the faceplate by absorbing ambient light from outside the exit pupil before it strikes the diffusion layer 44. By lowering the numerical aperture of the faceplate, the exit pupil can be reduced to match the desired viewing "box" or exit pupil for the display, negating any ambient effects outside this box, as illustrated in FIG. 6. The thickness of the radiused fiber optic faceplate 46 can be made relatively thin so that it does not add appreciable depth to the screen assembly 40.

Figure 5:
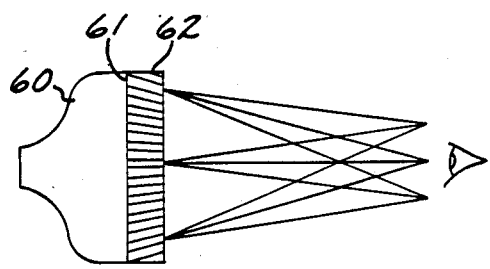
FIG. 5 illustrates a second preferred embodiment of the invention, where a direct view CRT generates an image and the image light is directed through a radiused fiber optic faceplate toward a predetermined exit pupil.

FIG. 5 illustrates another embodiment of an optical apparatus employing the invention. Here, a direct view monochromatic CRT 60 having a CRT phosphor surface 61 generates the image light, which is directed through the radiused fiber optic faceplate 62 to the exit pupil. As with the embodiment of FIG. 3, the optical apparatus has a substantially reduced numerical aperture compared with a conventional apparatus with a parallel fiber faceplate.

Figure 1A:
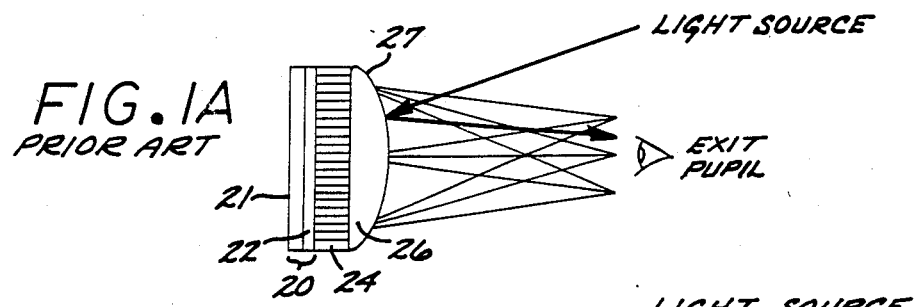
FIGS. 1A and 1B are simplified schematic drawings of an optical apparatus comprising a diffusion screen, a conventional fiber optic faceplate and a field lens.
Figure 1B:
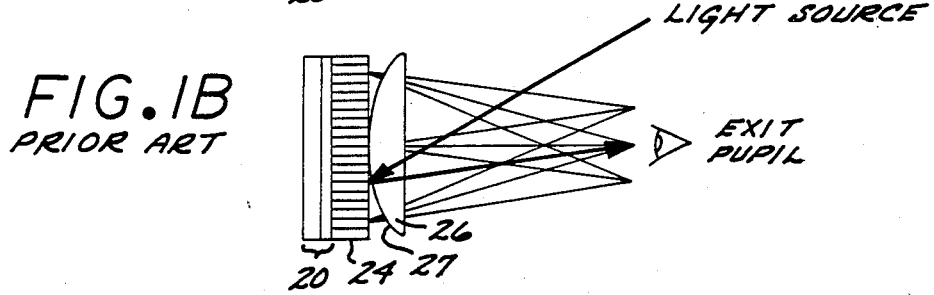
Figure 2:
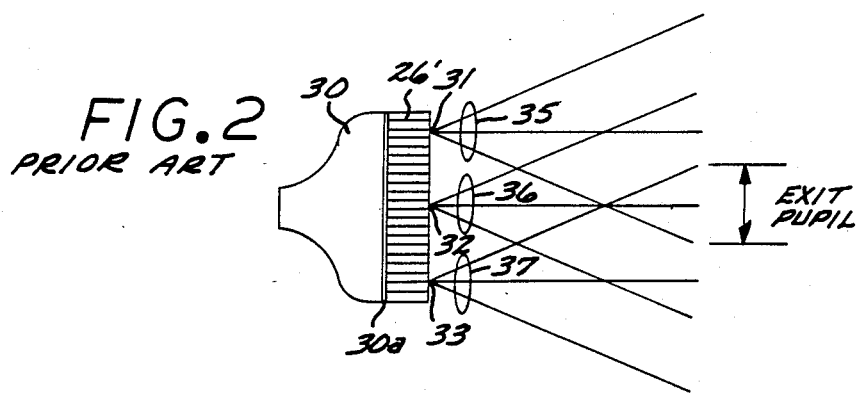
FIG. 2 is a simplified schematic diagram of an optical apparatus comprising a CRT and a conventional fiber optic faceplate.

FIG. 6 further illustrates the advantages achievable by use of a radiused fiber optic faceplate in accordance with the invention. Conventional fiber optic faceplates have been used with direct view cathode ray tubes (CRTs) to enhance the contrast, as illustrated in FIG. 2. However, since the fibers are all parallel in a conventional faceplate, as depicted in FIG. 2, the numerical aperture must be purposely kept high in order that the viewer can see all of the CRT from his viewing position. The higher the numerical aperture, though, the more ambient light can transmit through the faceplate and scatter off the CRT phosphor, thereby reducing contrast. Using a radiused fiber optic faceplate 62 instead of faceplate 26' with such a direct view CRT allows the numerical aperture to be substantially reduced, as shown in FIG. 5. This in turn substantially reduces the ambient light which can transmit through the faceplate and scatter off the CRT phosphor.

To fabricate a radiused fiber optic faceplate, a conventional faceplate with parallel fibers is heated to a softening temperature and allowed to slump over a mandril of the specified spherical radius. After cooling, the curved faceplate is cut down and polished into a flat faceplate but now with the fibers pointing towards the center of the spherical tool. This radiused fiber optic faceplate can then be integrated either with a diffusion screen or a CRT phosphor to produce a screen which directs the diffused light toward the viewer, as shown in FIGS. 3 and 5.

This fabrication technique is illustrated in FIGS. 7A–7D. Referring to FIG. 7, a raw plate 70 of fiber optic faceplate material of sufficient thickness and size is provided with the nominal fiber axes, e.g., axis 72, on axis for on-axis viewing, or alternatively with the fiber axis tilted to some extent for off-axis viewing. The dimensions of the raw plate 70 must be such that after slumping and cooling, the final cut-out piece is the size required by the display design.

Figure 7A:
FIGS. 7A-7D illustrate the general steps of a preferred method for fabricating a radiused fiber optic faceplate in accordance with the invention.
Figure 7B:
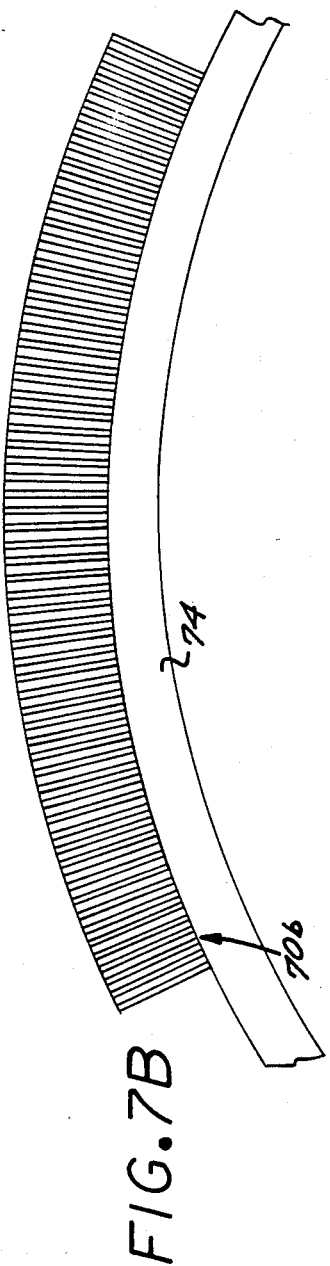
Figure 7C:
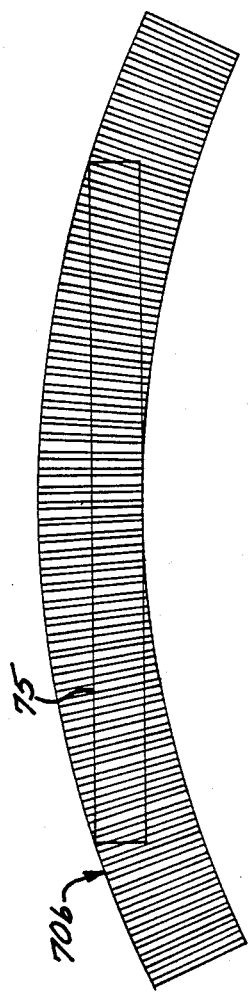
Figure 7D:

The raw fiber optic faceplate 70 is heated carefully in an oven until it reaches its softening temperature. The temperature will be selected in accordance with the particular composition of the faceplate material being employed, and monitored so that the faceplate material does not reach a melting temperature. The heated faceplate is placed on top of a spherical metal mandril 74 (shown in cross-section in FIG. 7B) which likewise has been heated to the same temperature as the faceplate. The curvature of the mandril 74 is chosen in accordance with the size and position of the exit pupil required by the display design. The faceplate is allowed to "slump" over the mandril until its bulk form matches the shape of the spherical surface of the mandril 74. Given that the slumping required is not great (as will be shown in the following example), the axes of the fibers should nominally orient themselves along radii of the spherical mandril, thereby creating the "radiused" fiber effect. The slumped faceplate 70A and mandril 74 are allowed to cool slowly until they are each back to room temperature, at which time the slumped faceplate 70A as shown in FIG. 7B may be removed from the mandril 74.

The central flat portion 75 of the slumped fiber optic faceplate 70B is then cut out according to the specifications of the design. The physically flat plate portion 75 is ground and polished with an optical finish. The resulting flat plate 75A then becomes the radiused fiber optic faceplate element which can then be integrated into the optical apparatus employing the radiused fiber optic faceplate.

Figure 8:
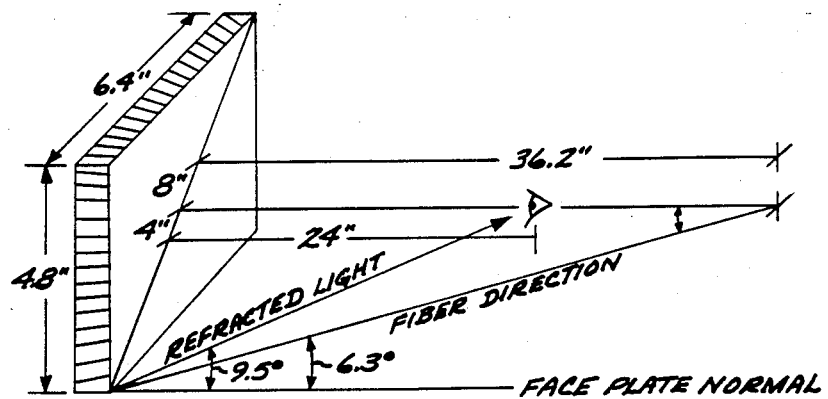
FIG. 8 is a simplified schematic drawing of a specified diffusion screen which may advantageously employ a radiused fiber optic faceplate.

As a particular example of an optical apparatus embodying the invention, a diffusion screen size of 6.4 inches by 4.8 inches viewed at a distance of 24 inches, as illustrated in FIG. 8, can take advantage of a radiused fiber optic faceplate. The diagonal of this screen is 8 inches and, therefore, the angle that the corner of the screen makes with the optical axis at the nominal viewing position is:

$$\tan^{-1}(4''/24'') = 9.5°$$

Since the faceplate has a typical refractive index of about 1.5, the angle of the fiber at this corner must be adjusted so that the chief ray exiting the fiber makes an angle of 9.5 degrees. Therefore, by Snell's Law, the fiber axis must be:

$$\sin^{-1}\left[\frac{\sin(9.5°)}{1.5}\right] = 6.3°$$

This angle then intersects the optical axis at a distance from the face plate of:

$$\frac{4''}{\tan(6.3°)} = 36.2''$$

Therefore, the radiused fiber optic faceplate must be made from a slumped faceplate over a spherical mandril having a radius of 36.2 inches.

At this radius, the raw fiber optic faceplate will slump to a sag at its edges of 0.22 inch from its originally flat state. Given that the thickness of the finished faceplate might have to be 0.25 inch in order to adequately absorb the ambient, the raw faceplate needs to have an initial thickness of at least 0.47 inch. These numbers are consistent with readily fabricated faceplates available from commercial sources, e.g., Incom, Inc., 205 Chapin Street, Southbridge, Mass. 01150.

If such a faceplate is used with a diffusion layer as a rear-projection screen, the overall uniformity of brightness is increased. For instance, if a diffusing glass of a gain of 15 (based on a readily available screen material #LS85 from Da-Lite Screen Co., Inc., Polacoat Division, 11500 Williamson Road, Cincinnati, Ohio 45241) was mounted on the back surface of a conventional fiber optic faceplate with all fibers and chief rays parallel to the optical axis (as in FIG. 2), there would be a roll-off in gain from the center to the corner of the screen. When viewed from the nominal position on the optical axis, the gain at the center would be 15, but at the corner, the ray makes an angle of 9.5 degrees with respect the screen gain axis, dropping the gain to 7, as dictated by the material angular performance. By using the radiused fiber optic faceplate, the gain at the corners would be the same as at the center, i.e., 15, since the chief rays emanating from the fibers would all point toward the nominal viewing position (as in FIG. 3). This approach would likewise allow higher gains in diffraction optics diffusing screens than would otherwise be possible.

With a numerical aperture of 0.35, the size viewing region or exit pupil at 24 inches would then be 18 inches in diameter. Therefore, any ambient light from outside this 18 inch viewing region would be absorbed by the radiused fiber optic faceplate. For faceplates with lower numerical apertures this size could be reduced even further.

To fabricate an exemplary radiused fiber optic faceplate from a conventional faceplate marketed by Incom, Inc., as its model 0.35NA faceplate material, the following process is understood to have been employed. Two cast iron laps or mandrils were fabricated, each with the appropriate radius of curvature, one with a convex surface, the other with a concave surface.

The mandril with the convex surface facing up was placed in an oven. The piece of conventional fiber optic faceplate to be slumped was placed on top of this mandril. The mandril with the concave lap with its surface facing down was placed on top of the faceplate piece. The oven was heated to 1120° F. and remained at that temperature for four hours. During this time, the faceplate slumped over the convex mandril. The oven was then turned off, and the entire assembly was allowed to slowly return to room temperature over an eight-hour period. The cooled slumped faceplate was then removed from the two mandrils, the flat portion cut out as described above with respect to FIGS. 7A-7D, and then ground and polished to provide the flat radiused fiber optic faceplate.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. An optical apparatus, comprising:
    a diffusion holographic optical element comprising means for diffracting a beam of light incident upon any particular point on said element from a predetermined direction toward an exit pupil; and
    a fiber optic faceplate comprising a substantially flat external surface facing said exit pupil and having light absorbing material and a plurality of optical fibers therein, said faceplate positioned with respect to said holographic optical element so that diffracted light passes therethrough, and wherein the optical fibers are each characterized by an optical axis, with the optical fibers oriented so that the diffracted light passed through each optical fiber is substantially directed to said exit pupil;
    wherein ambient light incident on said external flat surface from outside said exit pupil is substantially absorbed by said light absorbing material, thereby enhancing the contrast provided by said optical apparatus.

2. The optical apparatus of claim 1 further characterized by a second flat surface, said second flat surface being substantially parallel to said external surface, said fibers and light absorbing material being disposed between said external and second flat surfaces.

3. The optical apparatus of claim 1 wherein the exit pupil is characterized by a center point disposed a predetermined distance from said faceplate, and wherein the optical fibers are oriented so that said respective optical axes are respectively aligned along corresponding radii emanating from said center point.

* * * * *